(12) United States Patent
Plymell (10) Patent No.: US 6,550,422 B2
(45) Date of Patent: Apr. 22, 2003

(54) LIVESTOCK FEEDER AND MANUFACTURING METHOD

(76) Inventor: K. Richard Plymell, 407 S. 18th St., Bethany, MO (US) 64424

(*) Notice: Subject to any disclaimer, the term of this patent is extended or adjusted under 35 U.S.C. 154(b) by 0 days.

(21) Appl. No.: 09/866,971

(22) Filed: May 29, 2001

(65) Prior Publication Data

US 2002/0179016 A1 Dec. 5, 2002

(51) Int. Cl.[7] .......................... A01K 1/10; A01K 39/00; A01K 5/00
(52) U.S. Cl. ............................ 119/61; 119/60
(58) Field of Search ............................ 119/61, 60, 58, 119/64, 51.01

(56) References Cited

U.S. PATENT DOCUMENTS

5,522,345 A   6/1996   Payne

Primary Examiner—Charles T. Jordan
Assistant Examiner—Judith A. Nelson
(74) Attorney, Agent, or Firm—Mitchell L. Crain; Shughart Thomson & Kilroy (57) ABSTRACT

A livestock feeder includes a sidewall with a top and a bottom. The sidewall forms an enclosure adapted for receiving feed. Rim and base rings are provided adjacent to the sidewall top and bottom, and a medial ring is located generally intermediate the rim and base rings. The rings can assume various geometric configurations, including circular and polygonal, which configurations define a footprint of the feeder. The rings are maintained in spaced, generally parallel relation by an upper tier of support bars extending between and connected to the rim and medial rings and a lower tier or space or bars extending between and connected to the base and medial rings. The rings comprise multiple sections which can be joined together mechanically with telescopic corrections, by welding or by adhesive. The spacer bars can likewise be connected to the rings by various connection techniques. The feeder components can be formed by extrusion, rotational molding or other suitable manufacturing methods. A method of manufacturing livestock feeders includes the steps of forming ring members with first, lesser radii, assembling sidewall sections with the ring members and support bars, and expanding the ring members to second, greater radii with the feeder in its finished configuration.

20 Claims, 12 Drawing Sheets

LIVESTOCK FEEDER AND MANUFACTURING METHOD

BACKGROUND OF THE INVENTION

1. Field of the Invention

The present invention relates generally to livestock feeding equipment, and in particular to a livestock feeder which can be assembled from plastic components in various configurations for dispensing hay and the like to livestock.

2. Description of the Prior Art

In the field of animal husbandry, feed materials represent one of the most significant expenses incurred by livestock operations. Grazing animals are commonly fed hay during the colder months when pasture grazing is not a viable feeding option. Hay feeders are typically designed to provide animals with accessibility to the hay and to minimize hay loss from waste and spoilage. A major cause of hay loss is direct ground contact, which causes the hay to absorb ground moisture. Thus, depositing round and square hay bales in open pastures tends to be relatively inefficient because the hay is often scattered by the feeding animals, causing significant losses to spoilage and rot. To avoid such losses, many hay feeders are designed to contain the contents of round or square hay bales in confined areas.

Waste and spoilage can also cause significant losses in other types of animal feeds as well. Therefore, a design objective for livestock feeders is the accommodation of different feed materials with minimal waste and spoilage, while facilitating access by feeding livestock. Since feeders are sometimes relatively large to accommodate correspondingly large hay bales and large animals, they are often shipped disassembled for assembly on site by the livestock operators. Therefore, other feeder design objectives include ease of assembly and compact shipping configurations to reduce freight and handling costs. Such costs can be minimized by complying with certain size limitations imposed by freight carriers. Thus, feeder manufacturers can reduce the delivered costs of their products by sizing their respective components to fit within certain size classifications which are commonly used to determine shipping costs.

Another feeder design objective is discouraging waste caused by animals extracting more feed than they can consume. For example, some animals throw feed pulled from feeders to the ground. Significant quantities of thrown feed can thus be lost to spoilage and rot from ground contact. Animals can be discouraged from wasting feed in this manner by providing access openings to feeders with configurations designed to prevent or discourage animals from rearing their heads back and throwing feed.

The prior art includes various feeders addressing some or all of the aforementioned design considerations. For example the Payne U.S. Pat. No. 5,522,345 discloses a livestock feeder with upright leg members interconnected by horizontal retainer members forming annular rings defining an enclosure for hay bales.

However, heretofore there has not been available a livestock feeder with the advantages and features of the present invention. The present invention addresses some or all of the aforementioned feeder design objectives.

SUMMARY OF THE INVENTION

In the practice of the present invention, a livestock feeder is provided which includes a sidewall with a top and a bottom. The sidewall generally forms an enclosure adapted for receiving and retaining feed therein. The sidewall includes a rim ring located at its top, a base ring located at its bottom, and a medial ring located generally therebetween. Each ring comprises multiple individual ring members joined together at their ends by connectors or by an other suitable connecting means such as adhesive, sonic wielding, etc. A plurality of upper tier support bars extend between and are connected to the rim and the medial rings. A plurality of lower tier support bars extend between and are connected to the base and the medial rings. A skirt can be provided around the sidewall lower tier to further enhance the feed retaining characteristics of the feeder. The components of the sidewall sections, i.e. the ring members and the support bars, can be connected together by mechanical fasteners or any other suitable fastening means, such as adhesives, sonic welding, fused welding, etc.

In the practice of the method of manufacturing the livestock feeders, plastic pipe with memory properties can be extruded with predetermined curvatures defining radii less than the finished feeder radius. The rings are thus precompressed and are expanded during the feeder assembly procedure. Their memory properties cause the ring members to tend to compress radially inwardly at their ends to provide a clamping effect. Alternatively, the sidewall sections can be rotationally molded and connected at the ring member ends.

OBJECTS AND ADVANTAGES OF THE INVENTION

The principal objects and advantages of the invention include:

Providing a livestock feeder; providing such a livestock feeder which utilizes a skeletal frame comprising plastic components; providing such a livestock feeder which includes multiple sections adapted for connection together; providing such a livestock feeder wherein the sections can be rotationally molded; providing such a livestock feeder wherein the sections can be assembled from individual components; providing such a livestock feeder which utilizes relatively simple assembly techniques; providing such a livestock feeder which comprises sections adapted for easy shipment and storage; providing such a livestock feeder which is adapted for effectively retaining feed within an enclosure defined by a sidewall thereof; providing such a livestock feeder which is relatively lightweight and strong; providing such a livestock feeder which is highly resistant to the elements; providing such a livestock feeder which is easily used by livestock; providing such a livestock feeder which can be easily moved; providing a livestock feeder manufacturing method which is particularly efficient; providing such a livestock feeder manufacturing method which facilitates field assembly of the components of the feeder; and providing such a livestock feeder manufacturing method which is efficient and economical.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Livestock Feeder 2

Figure 1:
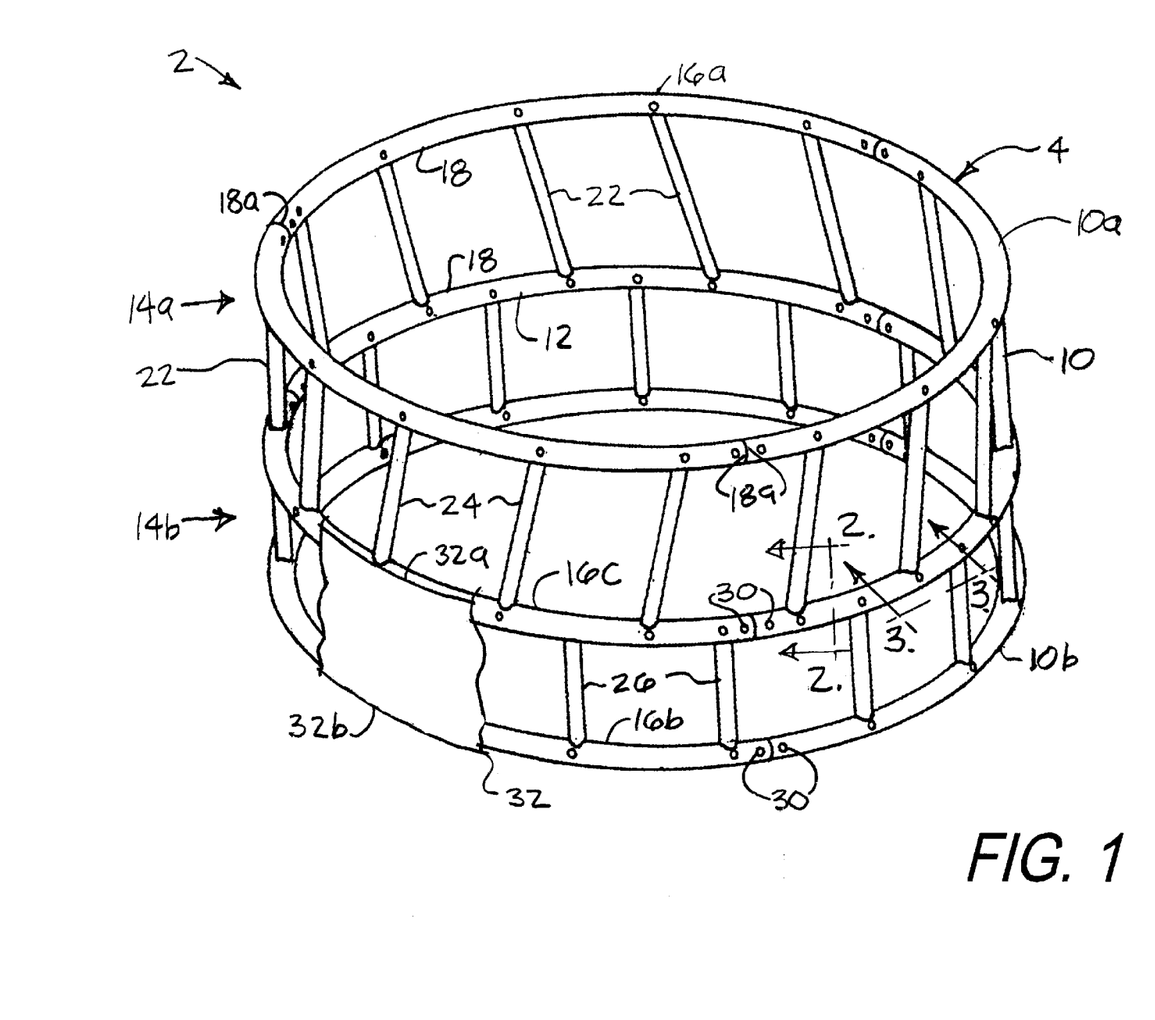
FIG. 1 is a perspective view of a livestock feeder embodying the present invention.

Referring to the drawings in more detail, the reference numeral 2 generally designates a livestock feeder embodying the present invention. The feeder 2 generally includes a skeletal structural system 4, which forms a sidewall 10 defining an interior enclosure 12. The sidewall 10 includes a top or rim 10a and a bottom 10b.

The skeletal structural system 4 includes an upper tier 14a adjacent to the sidewall top or rim 10a and a lower tier 14b adjacent to the sidewall bottom 10b. A rim ring 16a is located adjacent to the sidewall top 10a; a base ring 16b is located adjacent to the sidewall bottom 10b; and a medial ring 16c is located intermediate the rim and base rings 16a,b. The medial ring 16c separates the upper and lower tiers 14a,b. Each ring 16 comprises a plurality of individual ring members 18 each having opposite ends 18a. For example, the feeder 2 as shown is generally circular and each ring 16a–c includes three members 18, although other numbers of members could be provided. Moreover, various other polygonal and curvilinear configurations can be formed within the scope of the present invention. The members 18 generally have hollow tubular configurations with continuous passages 18b open at their ends 18a. Each ring 16a–c also includes a plurality of receivers 20 positioned in spaced relation. The rim ring 16a includes downwardly-open receivers 20a; the base ring 16b includes upwardly-open receivers 20b; and the medial ring 16c includes both upwardly-open and downwardly-open receivers 20c,d, which are staggered.

Figure 2:
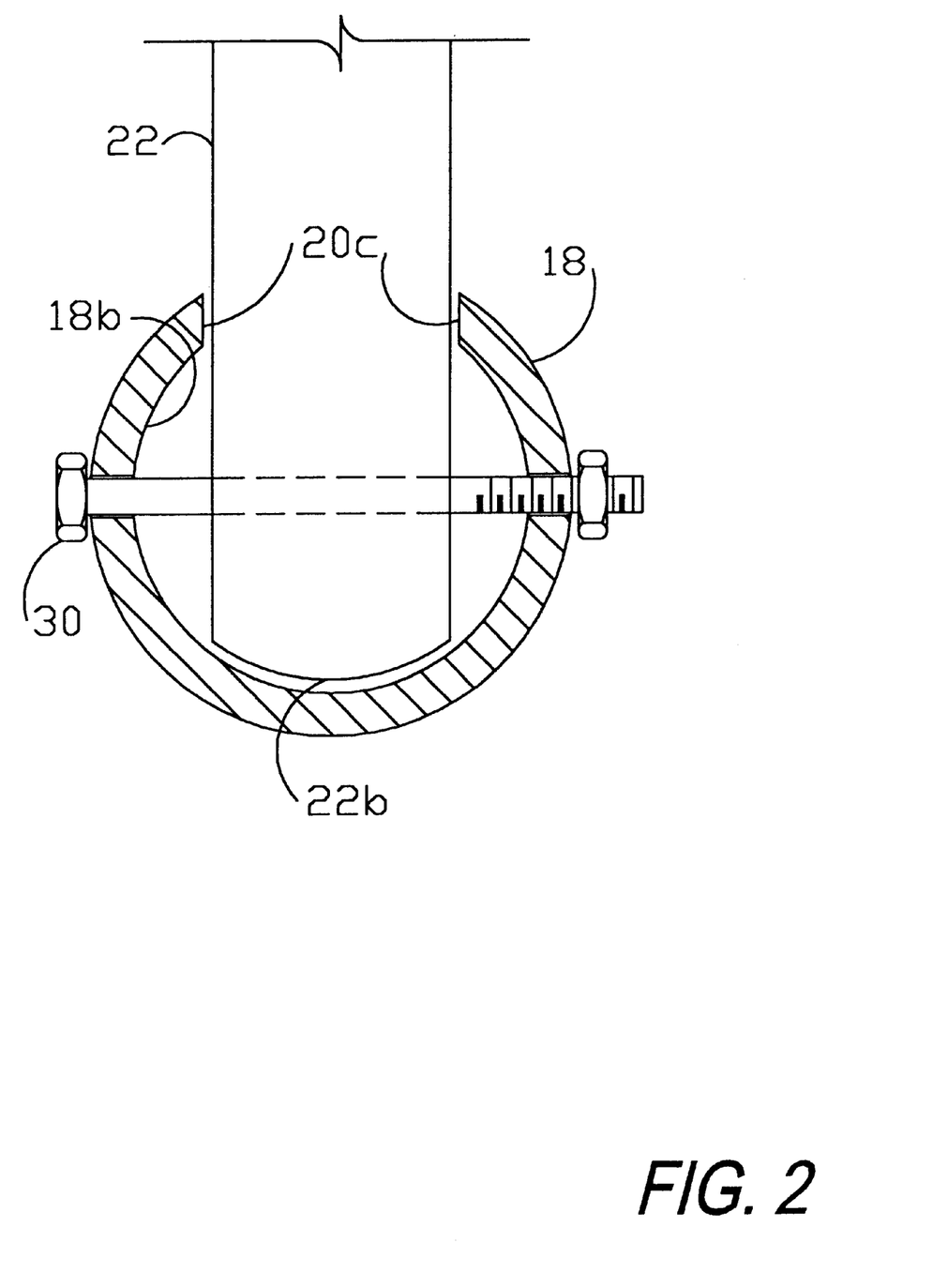
FIG. 2 is an enlarged, fragmentary, vertical cross-sectional view thereof, taken generally along line 2—2 in FIG. 1.
Figure 3:
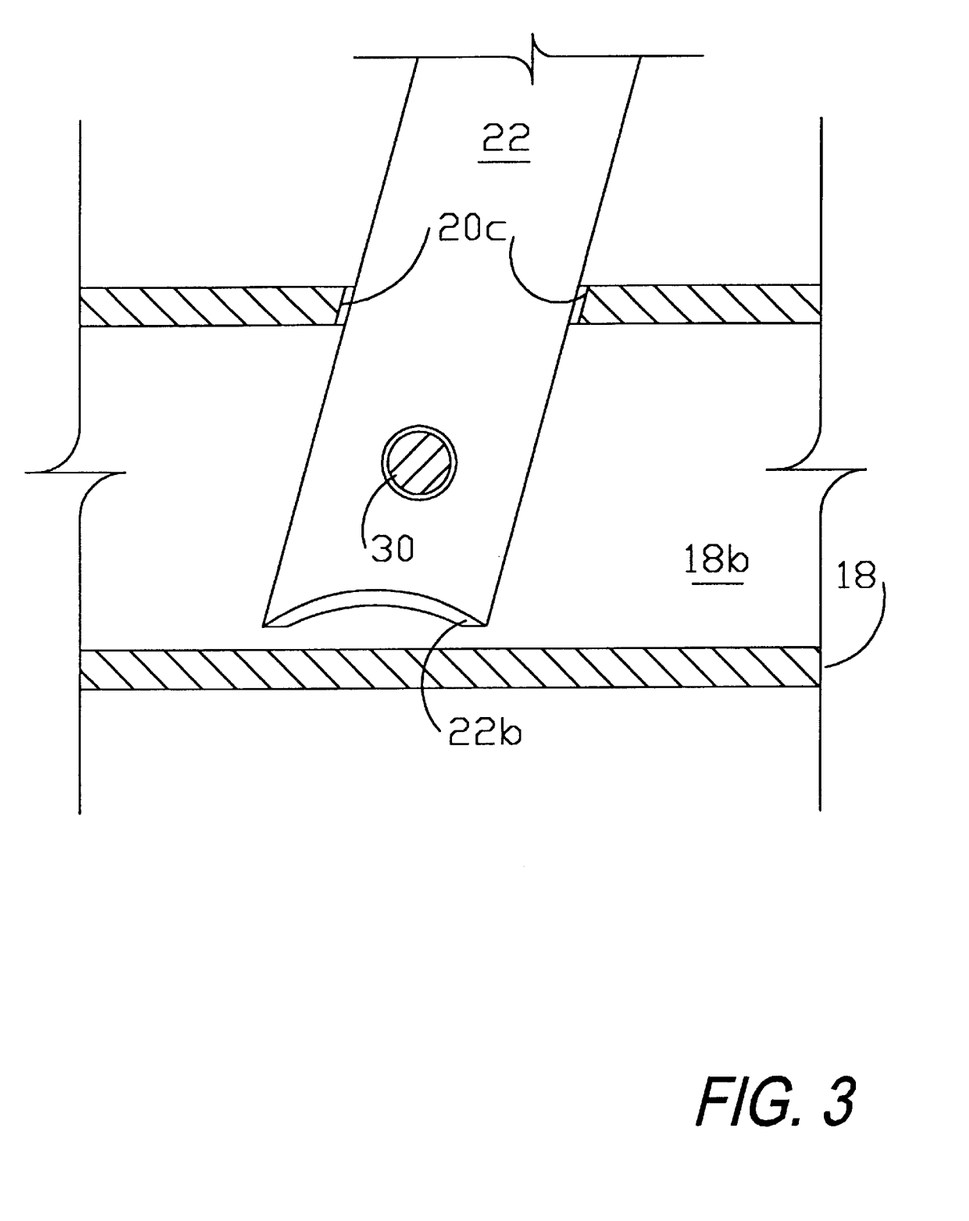
FIG. 3 is an enlarged, fragmentary, vertical cross-sectional view thereof, taken generally along line 3—3 in FIG. 1.

The upper tier 14a includes a plurality of upper tier support bars 22 each having upper and lower ends 22a,b received in receivers 20a,c in the rim and medial rings 16a,c respectively. Each support bar 22 has an outside diameter (e.g., about 2 inches) which is less than an outside diameter (e.g., about 3 inches) of the ring members 18 whereby the receivers 20a–d can be formed in the rings 16a–c with receiver diameters approximately equal to or slightly greater than the diameters of the support bars 22 (FIG. 2). The upper tier support bar ends 22a,b are convex in configuration to generally conform to the shape of the member passages 18b. The upper tier support bar ends 22a,b are cut at an angle of approximately 75° to accommodate the 15° slanted-from-vertical orientations of the support bars 22 (FIG. 3). A plurality of access openings 24 are formed between respective upper tier support bars 22 and the rim and medial rings 16a,c. Each access opening 24 has a generally parallelogram-shaped configuration. The width of the access openings 24 can vary according to the species of livestock for which the feeder 2 is intended to be used. For example, the upper tier support bars 22 can be spaced at approximately 8 to 10 inches on centers for sheep and goats, whereas a spacing of approximately 40 inches on centers would be more suitable for horned cattle.

The lower tier 14b includes a plurality of lower tier support bars 26 each having upper and lower ends 26a,b received in receivers 20b,d in the base and medial rings 16b,c respectively. The lower tier support bars 26 are generally vertical and are positioned at locations which are staggered from the upper tier support bars 22 for greater strength and rigidity. The ring members 18 and the support bars 22, 26 which interconnect same form sidewall sections 25. In the illustrated embodiment sidewall 10 comprises three such sidewall sections 25, which can be connected to assemble the feeder 2 as described below. The feeder 2 could thus be shipped as three preassembled sidewall sections 25 adapted for connection and final assembly in the field. Alternatively, the feeder 2 could be shipped completely disassembled into a collection of members 18 and support bars 22, 26, together with other components such as connectors 28, bolts 30, a skirt 32 and the like. Field assembly could be accomplished in any desired sequence. For example, the rings 16a,b,c could be completely assembled first and then interconnected by the support bars 22, 26.

Figure 4:
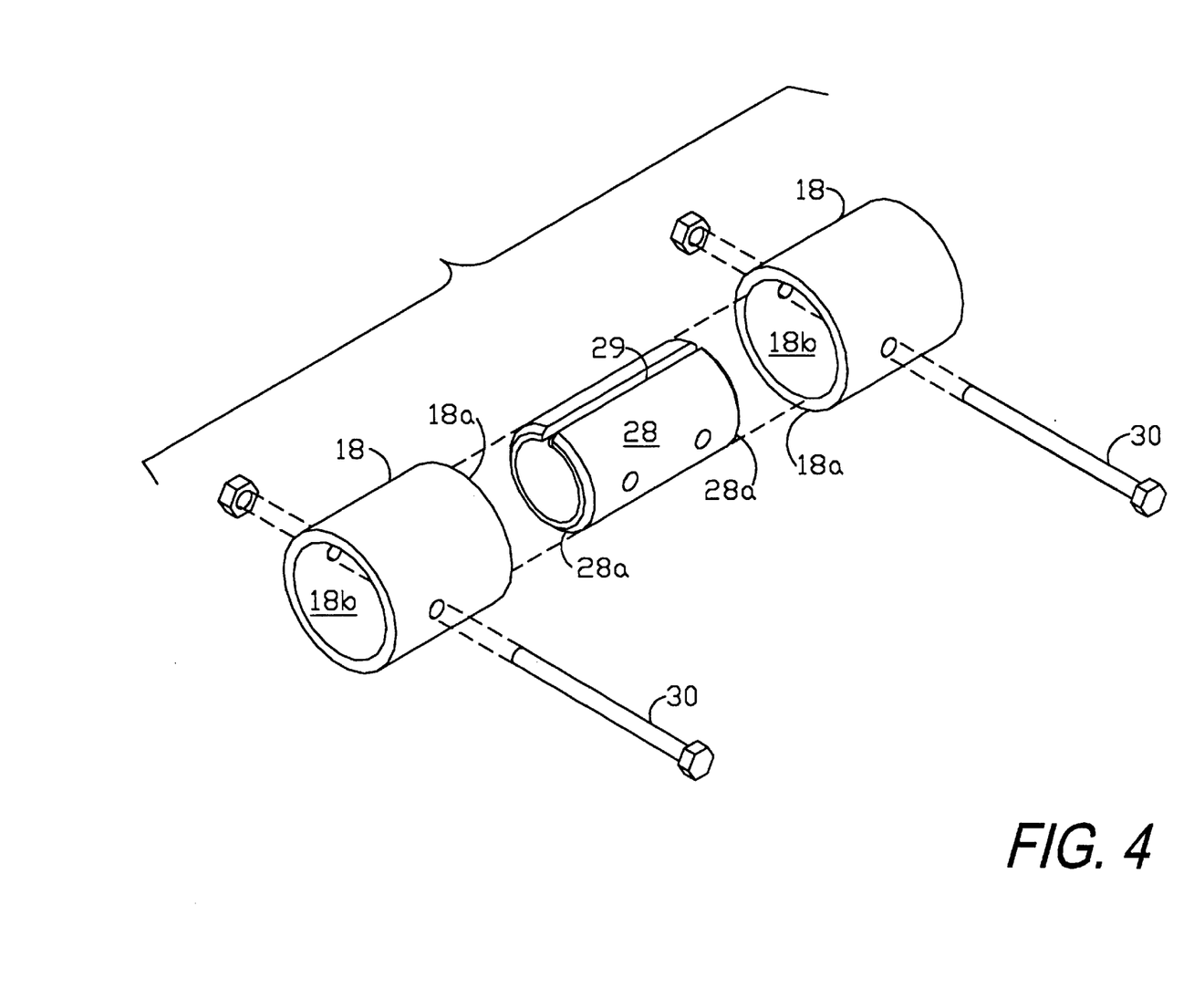
FIG. 4 is an exploded, perspective view of a connector thereof adapted for connecting ring members at their ends.

The ring members 18 are connected at their respective ends 18a by respective connectors 28 which are generally tubular, relatively short and can be provided with optional longitudinally-extending slots 29 and chamfered ends 28a (FIG. 4). The connector ends 28a are telescopically received in the ring member ends 18a and thus extend somewhat into the ring member passages 18b. The slots 29 in the connectors 28 facilitate radially compressing the connectors 28 for insertion into the ring member ends 18a, whereafter the compressed conditions of the connectors 28 effect frictional engagements between the connectors 28 and the ring members 18. To further secure these connections, bolts 30 can be provided and extended through the members 18 adjacent to their ends 18a and also through the connectors 28.

A skirt 32 can optionally be provided for mounting on the feeder 2. The skirt 32 includes upper and lower margins 32a,b, which generally correspond to the configuration of the lower tier 14b. The skirt 32 is shown bolted to the base and medial rings 16b,c. The skirt 32 generally surrounds the lower tier 14b and its lower and upper margins 32b,a are located in proximity to the base and medial rings 16b,c respectively. The skirt 32 is preferably placed on the outside of the feeder 2 at its lower tier 14b. This location for the skirt 32 is preferred over placing it on the inside of the lower tier 14b. A potential problem with placing the skirt 32 on the inside of the feeder sidewall 10 is that livestock might step between the skirt 32 and the base ring 16b and thus become entangled with the feeder 2.

III. Feeder Manufacturing Method

Figure 5:
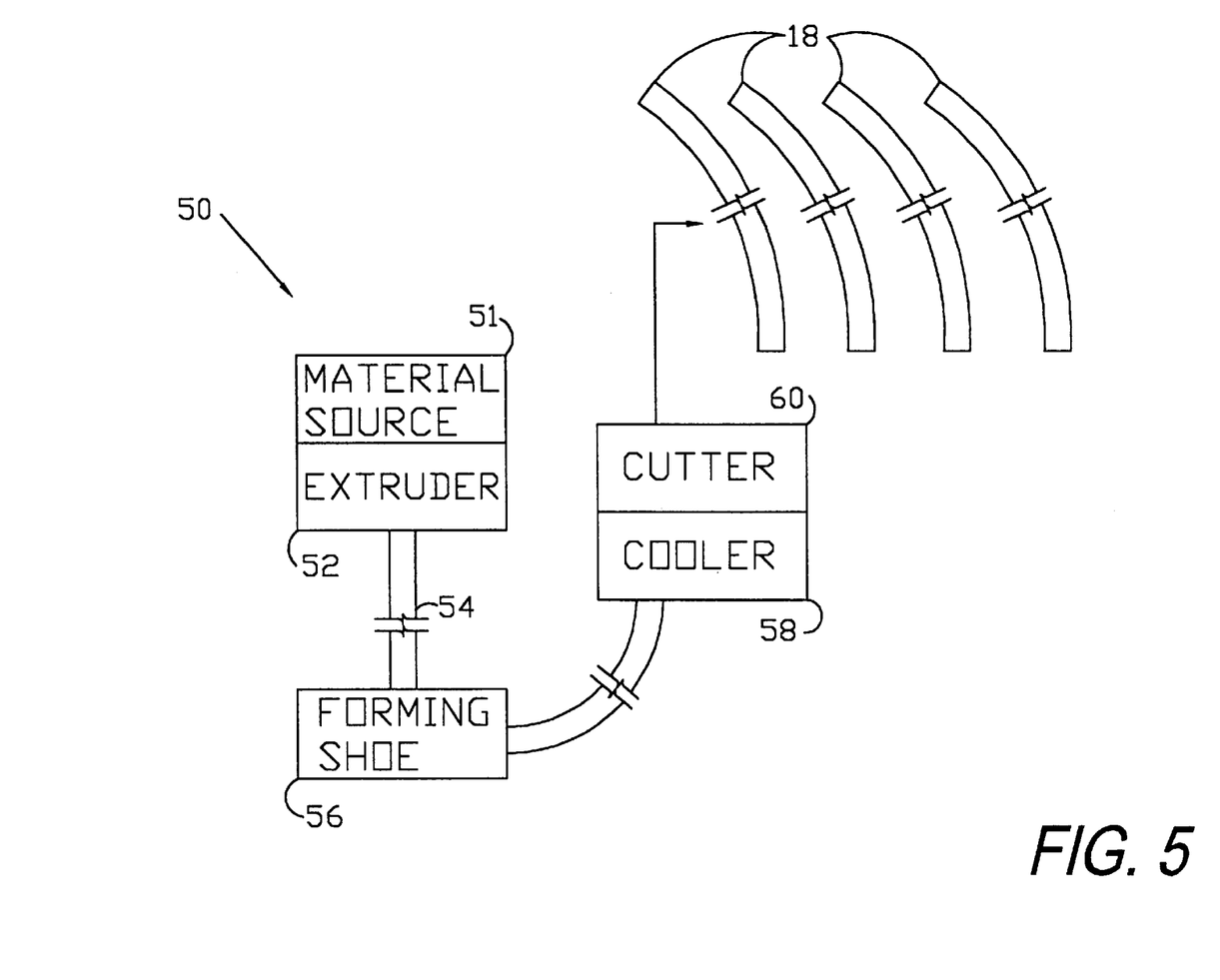
FIG. 5 is schematic diagram of a system for manufacturing livestock feeders embodying the present invention.

A system 50 for manufacturing the feeder 2 is shown in FIG. 5 and includes a 51 source of suitable material, such as polypropylene, polyethylene or polyvinyl chloride (PVC). Material from the material source 51 is fed to an extruder 52 which extrudes tubing 54. The extruded tubing 54 passes through and is curved by a forming shoe 56. The tubing 54 next passes through a cooler 58 which sets the formed shape, i.e. with a predetermined curvature.

The configuration of the rings resulting from the manufacturing process is generally circular with radii slightly (e.g., about 10%) smaller than the desired final radii of the rings 16a–c. Consequently, the undersized circular configuration of the tubing 54 tends to compress the rings 16a–c during assembly of same. Thus, the assembler normally spreads the ends 18a of the last two members 18 to be joined. This diameter-compression feature of the rings 16 facilitates their assembly due to the memory of the plastic whereby the member ends 18a push against each other in abutting relation while the connectors 28 are placed and bolted into position. A cutter 60, such as a cutoff saw or some other suitable tubing cutter, cuts the members 18 to their desired lengths.

Figure 6:
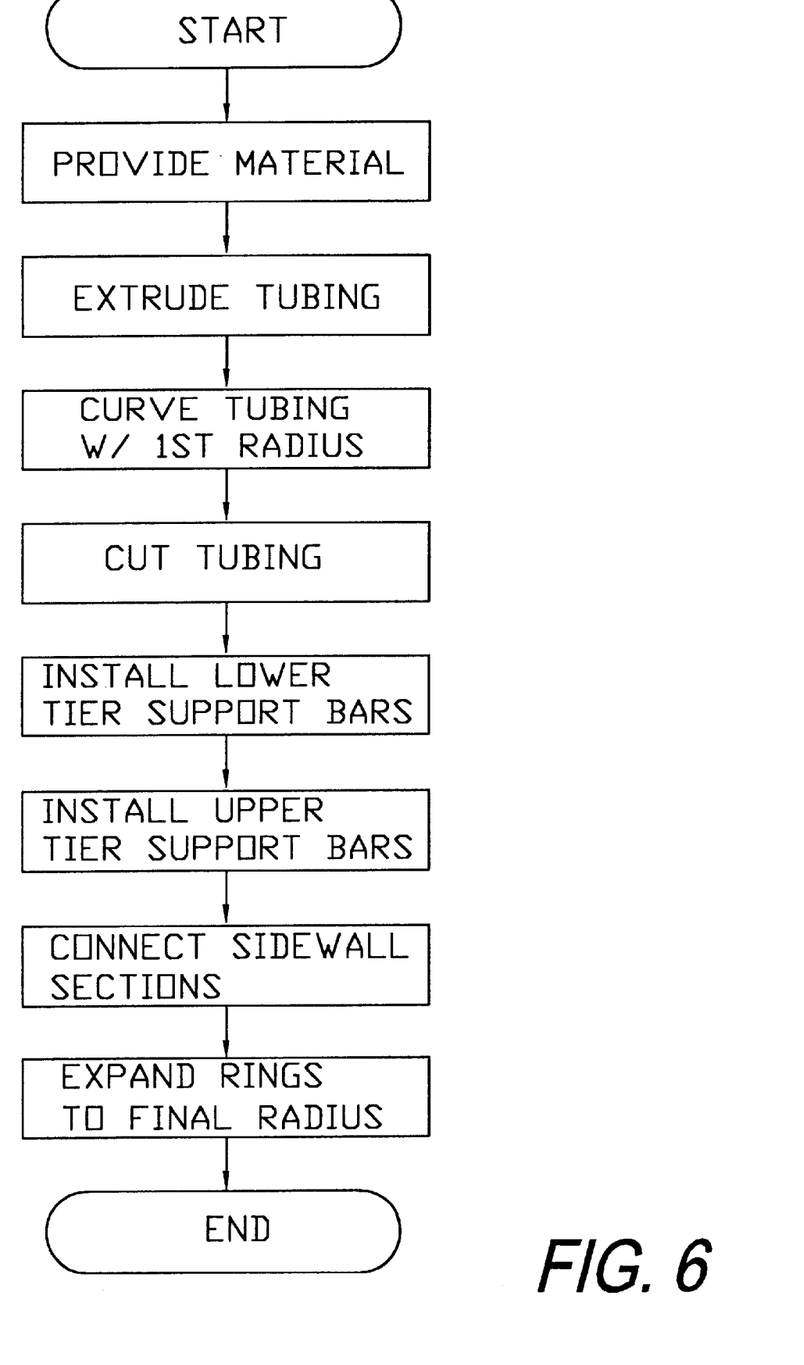
FIG. 6 is a flow chart showing a method of manufacturing livestock feeders embodying the method of the present invention.

FIG. 6 is a flow chart of a method of manufacturing a feeder, such as livestock feeder 2, utilizing a system, such as the feeder manufacturing system 50.

IV. First Modified Embodiment Feeder 102

Figure 7:
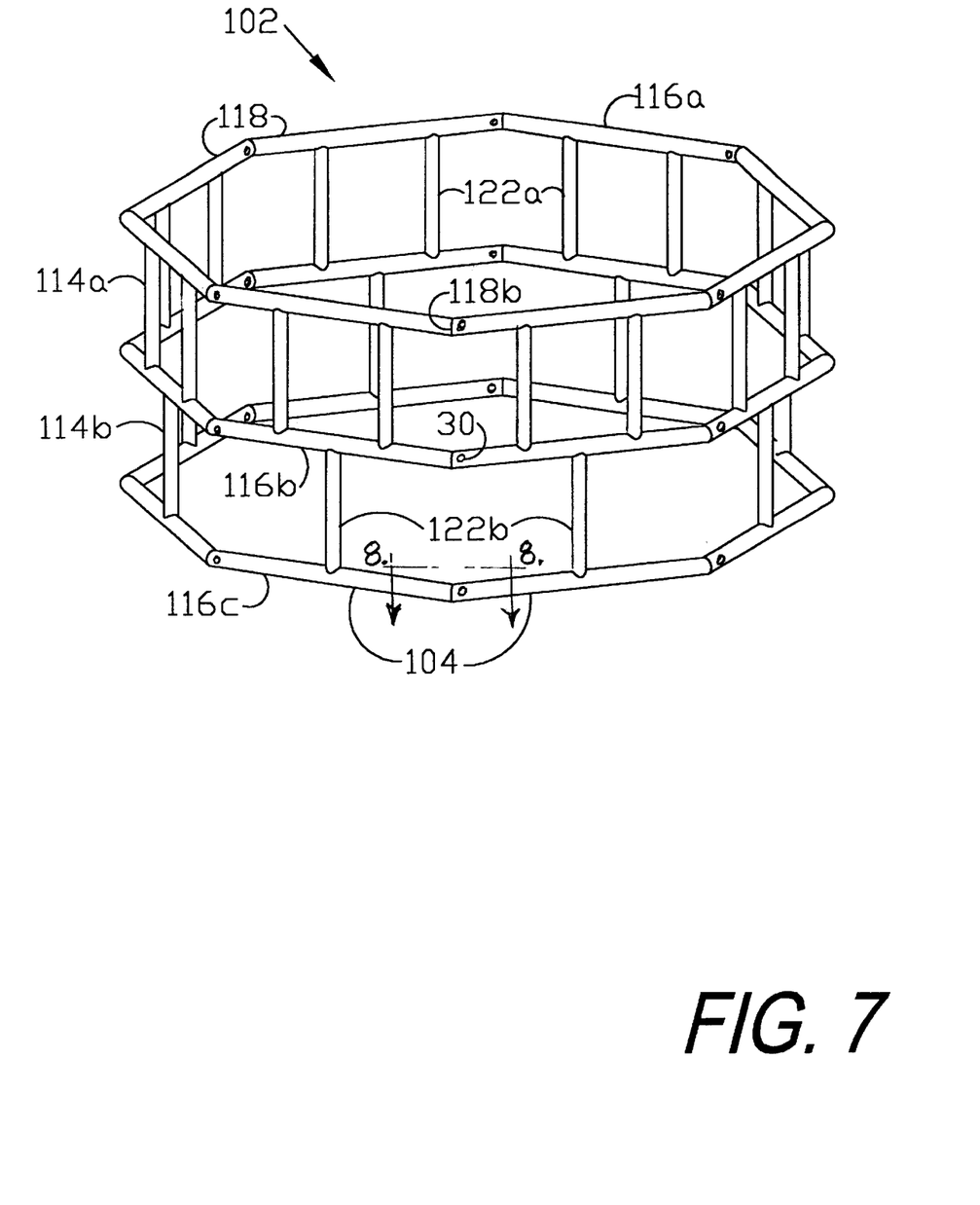
FIG. 7 is a perspective view of a livestock feeder comprising a first modified embodiment of the present invention with an octagonal configuration in plan.
Figure 8:
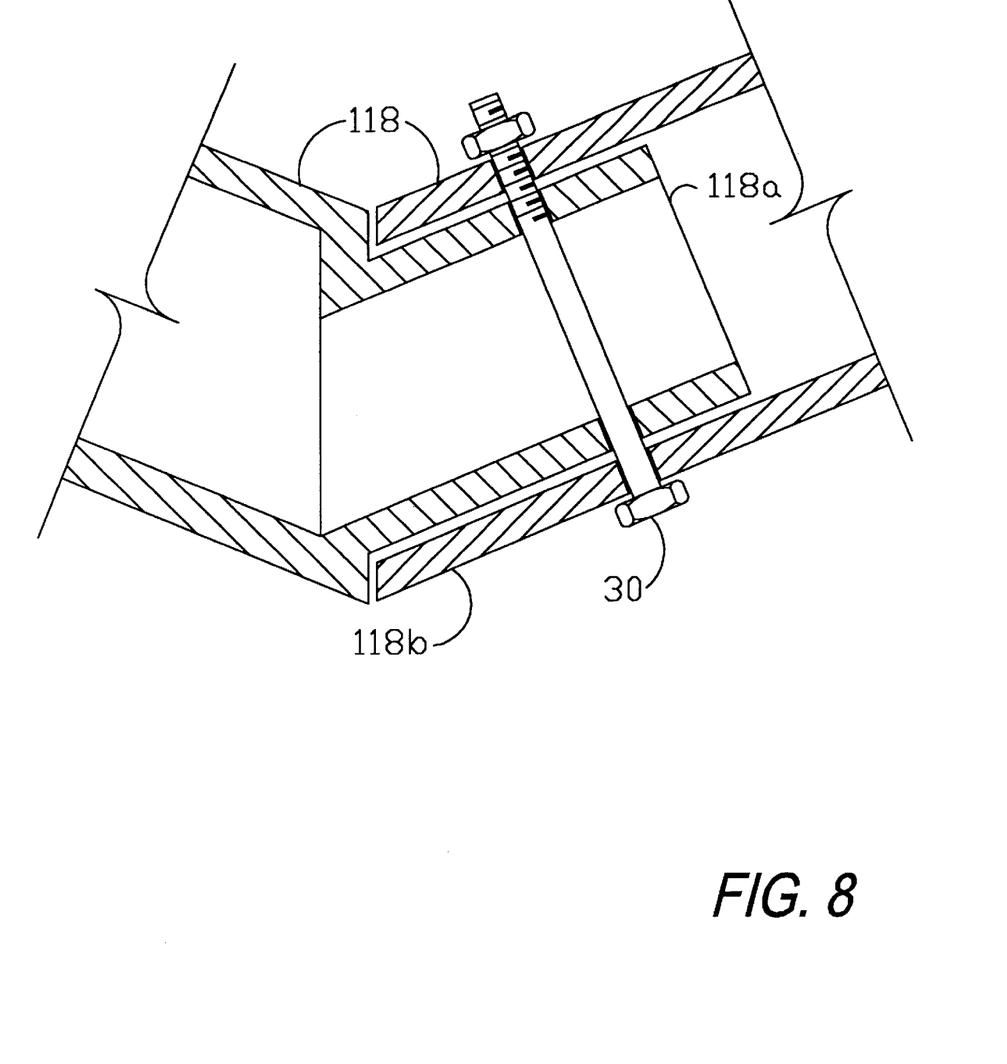
FIG. 8 is an enlarged, fragmentary, cross-sectional view showing a telescopic connecter for the ring member ends thereof.

FIG. 7 shows a feeder 102 comprising a first modified embodiment of the present invention with a generally octagonal configuration comprising multiple panels 104 formed by a rotational molding process. The feeder 102 includes rim, base and medial rings 116a–c each comprising individual, horizontal members 118 with male and female ends 118a,b respectively (FIG. 8). The feeder 102 also includes upper and lower tiers 114a,b with upper and lower tier support bars 122a,b respectively. Each panel 104 thus comprises horizontal members 118 (which collectively form the rings 116) and support bars 122a,b, all integrally formed. The panels 104 are secured together by inserting the member male ends 118a into corresponding member female ends 118b and securing the resulting telescopic interconnections by any suitable fastening means, such as bolts, adhesive, welding, etc.

The panels 104 can be rotationally molded into a wide variety of configurations to form feeders 102 with correspondingly varied configurations. For example, polygonal (i.e. triangular, rectangular, pentagonal, hexagonal, septagonal, octagonal, etc.) feeders can be formed with flat-sided panels 104. Circular feeders 102 can be formed from curved panels 104. The panels 104 can be rotationally molded to provide finished dimensions which accommodate shipping, storing and other logistical considerations. Moreover, the rings 116 and the support bars 122 can comprise tubing with square, circular or other cross-sectional configurations.

V. Second Modified Embodiment Feeder 202

Figure 9:
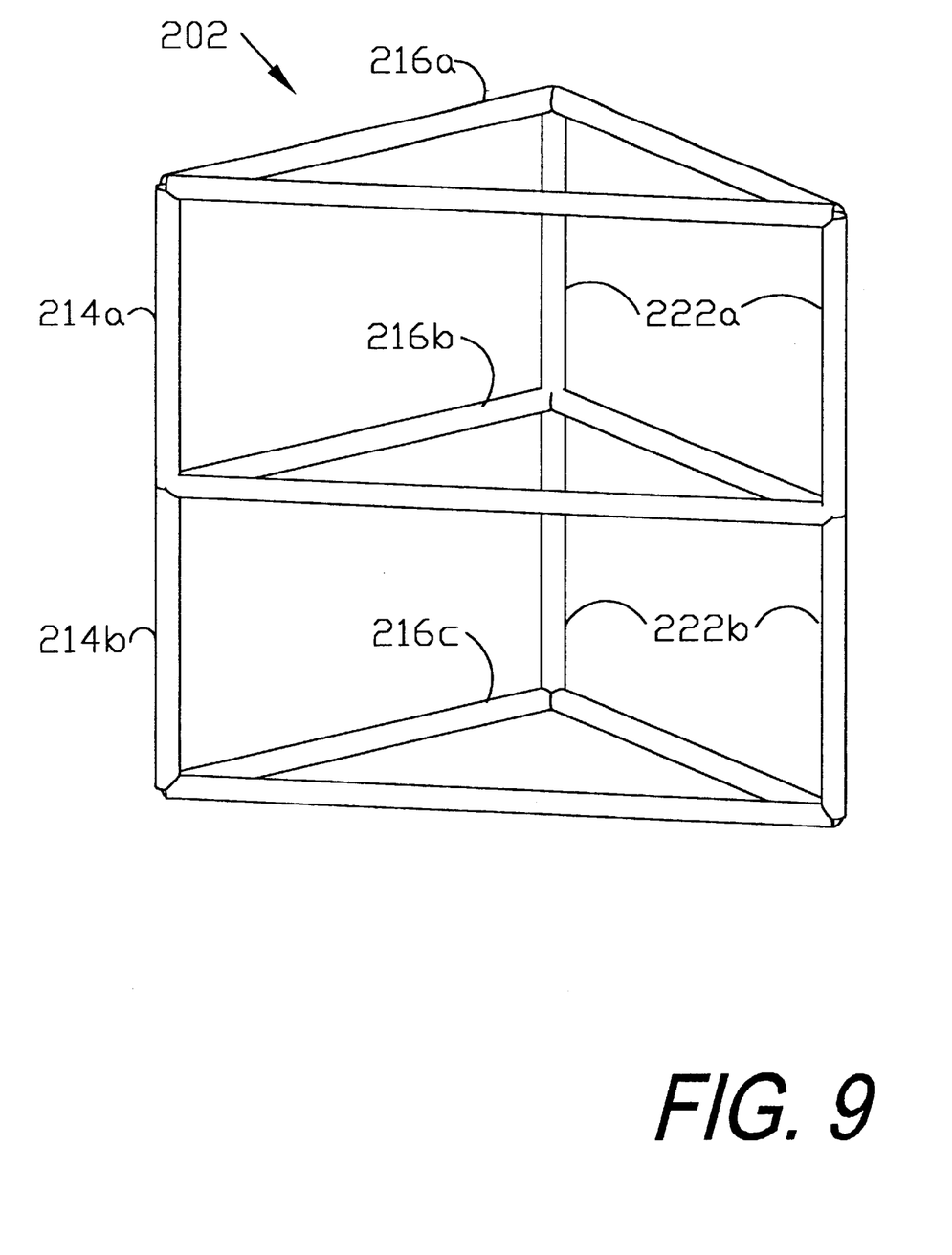
FIG. 9 is a perspective view of a livestock feeder comprising a second modified embodiment of the present invention with a triangular configuration in plan.

A triangular footprint feeder 202 comprising a second modified embodiment of the present invention is shown in FIG. 9 and includes upper and lower tiers 214a,b with rim, base and medial rings 216a,b,c each having generally triangular configurations. The tiers 214a,b include upper and lower support bars 222a,b respectively. The triangular feeder 202 is particularly useful for placement with one side against a barn, and the other side against a second structure, such as a fence. The long or hypotenuse side of the feeder 202 can thus be exposed and accessible to the livestock feeding thereat.

VI. Alternative Connection Systems

Figure 10:
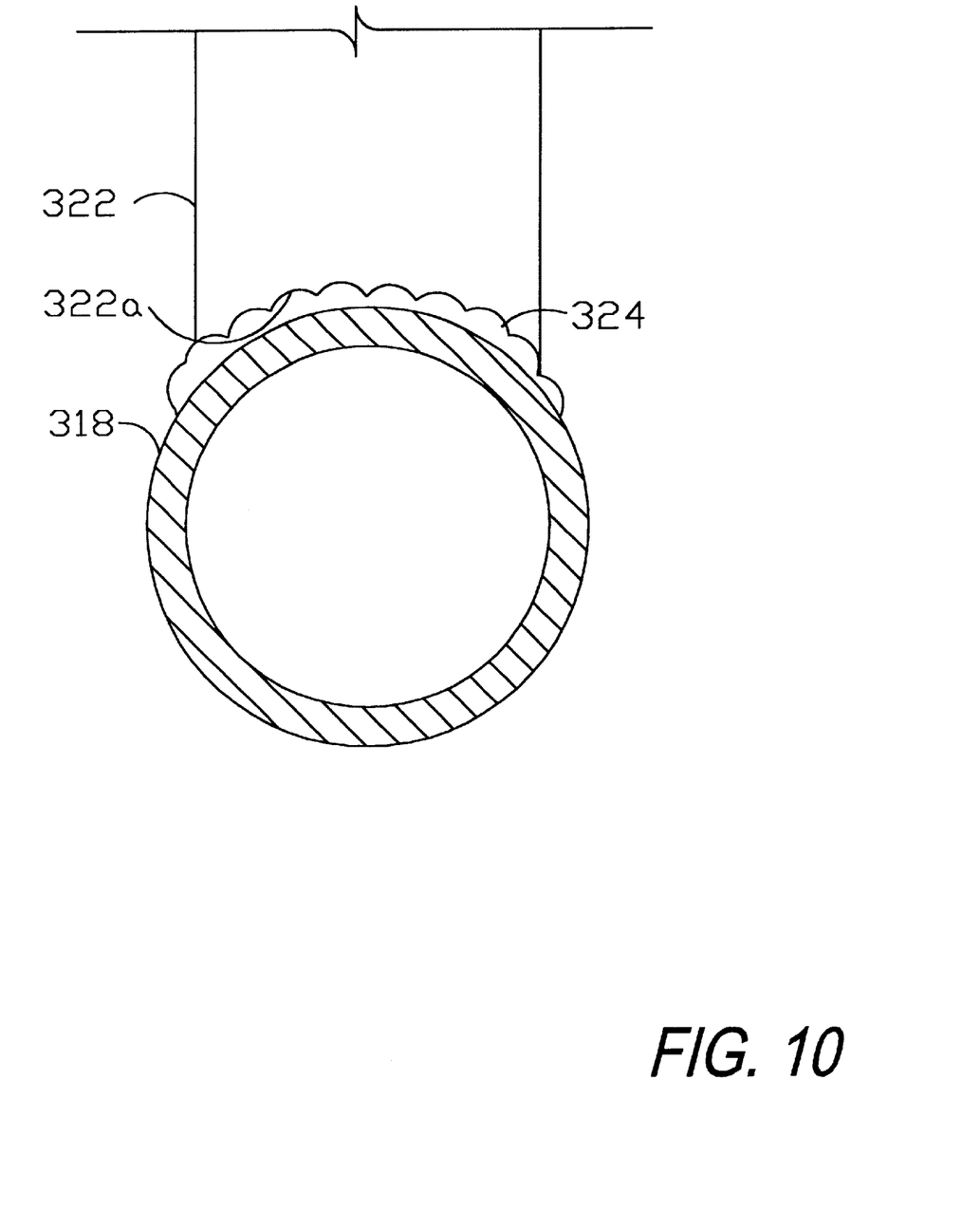
FIG. 10 is cross-sectional view of a weldment connection for circular cross-sectional tubes comprising the skeletal frame of the livestock feeder.

FIG. 10 shows an alternative connection system utilizing plastic weld connections. A circular cross-sectional horizontal member 318 is welded to a vertical or slanted support bar 322 at a plastic weldment 324. The support bar 322 includes an end 322a with a concave configuration adapted to saddle the horizontal member 318. The support bar 322 can have a diameter which is equal to or less than the diameter of the horizontal member 318.

Figure 11:
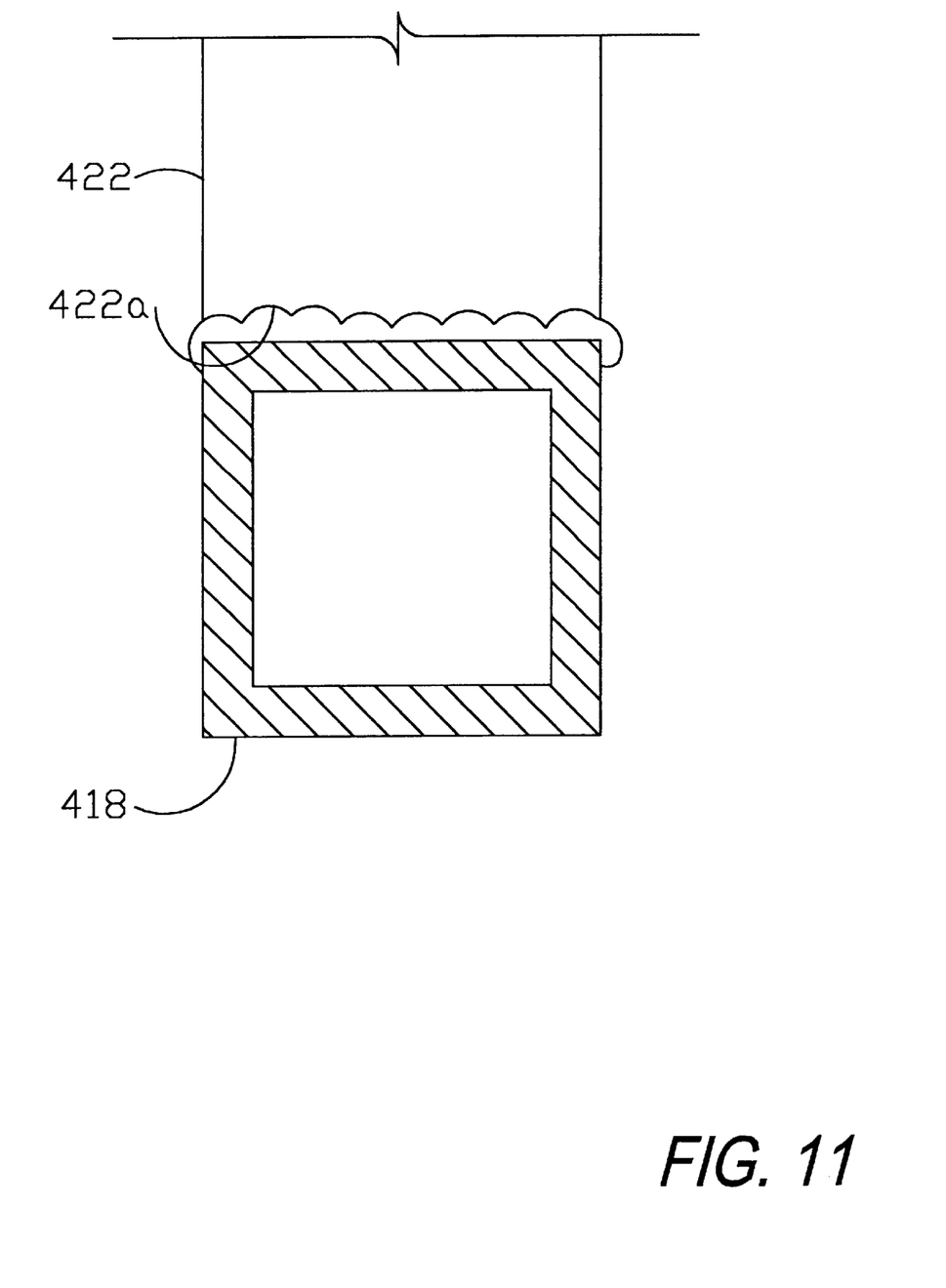
FIG. 11 is a cross-sectional view of a weldment connection for square cross-sectional tubes comprising the skeletal frame of the livestock feeder.

FIG. 11 shows a horizontal member 418 with a square cross-sectional configuration welded to a support bar 422 which also has a square cross-sectional configuration. The support bar 422 includes an end 422a which can be square-cut or cut at an angle to align the support bar 422 vertically or at an angle with respect to the horizontal member 418.

Still further, feeders according to the present invention can be fabricated with various combinations of horizontal members and support bars having circular and square cross-sectional configurations.

Figure 12:
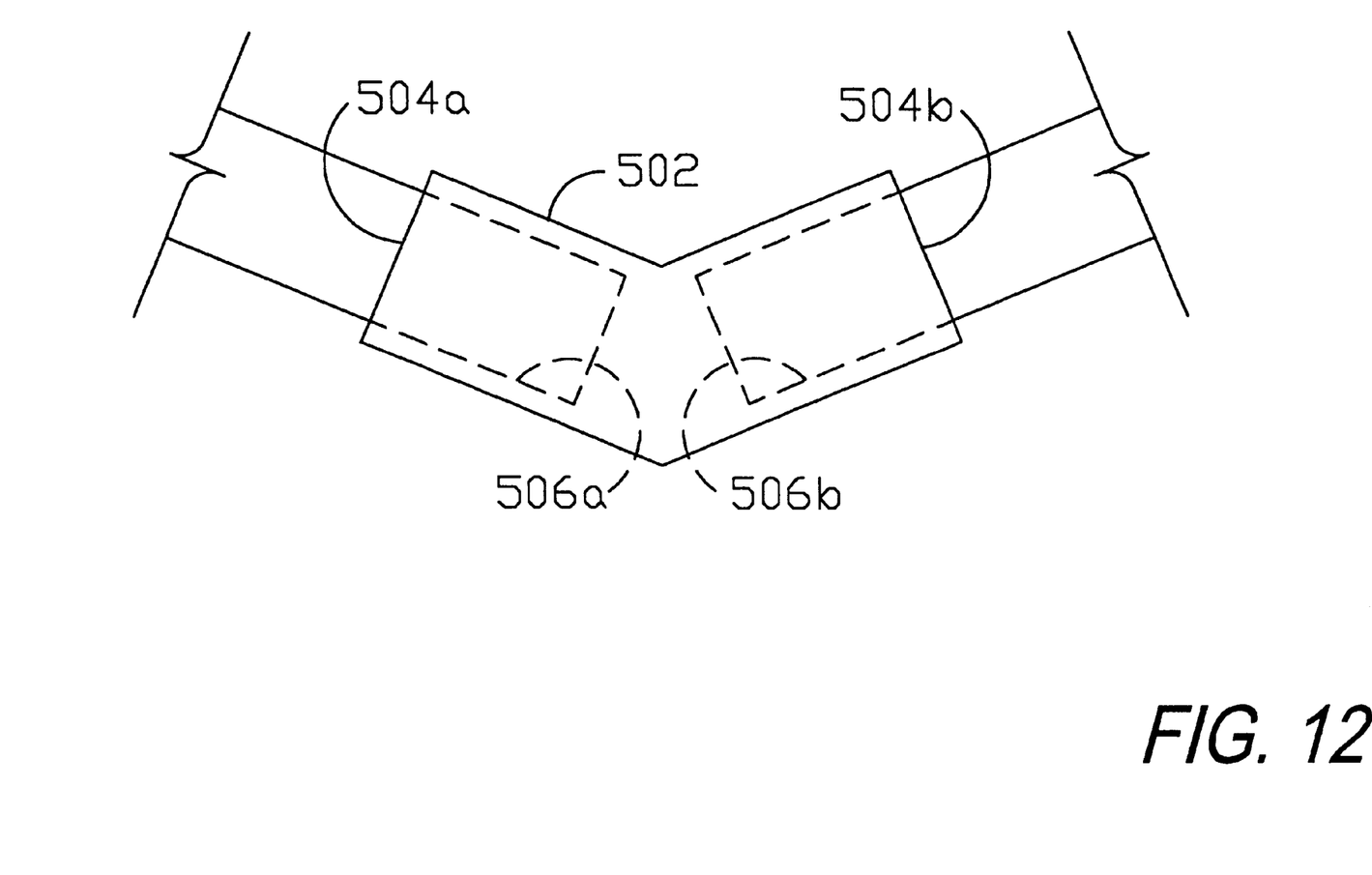
FIG. 12 is an enlarged, fragmentary view showing an alternative elbow connector for the ring member ends.

FIG. 12 shows yet another alternative connection system with a fitting 502 comprising an elbow with first and second female ends 504a,b. The ends 504a,b define receivers 506a,b adapted to receive ring member ends 18a. It will be appreciated that most, if not all, of the feeder configurations shown and described herein could be constructed with suitable fittings similar to the elbow 502. For example, the elbow 502 shown forms an angle of 135° and would thus be suitable for constructing the octagonal feeder 102. Similar fittings formed with other angular configurations, straight connectors, Tee connectors, cross connectors and the like could be used for forming various other feeder configurations.

It is to be understood that while certain forms of the present invention have been illustrated and described herein, it is not to be limited to the specific forms or arrangement of parts described and shown. In addition to the feeder configurations shown, various other configurations can be assembled using components similar to those described above. For example, connectors with various angular orientations can be employed for assembling feeders in a wide variety of configurations to fit various spaces and accommodate various feeding animals.

What is claimed and desired to be secured by Letters Patent is as follows:

1. A livestock feeder having a sidewall including a top and a bottom and forming a feed-receiving enclosure, said sidewall comprising:

a) a plurality of rings, including a rim ring located at said sidewall top, a base ring located at said sidewall bottom and a medial ring located intermediate said rim and base rings; each said ring comprising a plurality of generally horizontal ring segments, each having opposite ends, and a plurality of connectors each connecting one said end of one of said ring segments to one said end of an adjacent one of said ring segments;

b) an upper tier including said rim and medial rings and a plurality of upper tier support bars extending therebetween, each said upper tier support bar including upper and lower ends connected to said rim and medial rings respectively; and c) a lower tier including said base and medial rings and a plurality of lower tier support bars, each said lower tier support bar including upper and lower ends connected to said medial and base rings respectively.

2. The invention of claim 1, which includes;
   a) each said ring segment having a hollow, tubular configuration open at each said ring segment end; and
   b) each said connector having a pair of male ends each telescopically received in a respective ring segment end and forming a telescopic connection therewith.

3. The invention of claim 2, which includes;
   a) a plurality of mechanical fasteners each extending through a respective telescopic connection.

4. The invention of claim 1 wherein said upper tier support bars are slanted from the vertical and form respective access openings therebetween with generally parallelagram-shaped configurations, said access openings providing access to said enclosure.

5. The invention of claim 1, which includes:
   a) each said ring having a hollow tubular configuration with a tube wall having an inside diameter;
   b) each said support bar having an outside diameter less than the inside diameters of the two of said rings to which it is connected; and
   c) each said tube wall having a plurality of support bar receivers formed therethrough, each support bar receiver receiving a respective one of said support bar ends.

6. The invention of claim 1, which includes:
   a) said rings having generally circular configurations and said ring segments having generally arcuate configurations.

7. The invention of claim 1 wherein said rings have generally polygonal configurations.

8. The invention of claim 7 wherein said rings have generally octagonal configurations.

9. The invention of claim 7 wherein said rings have generally rectangular configurations.

10. The invention of claim 7 wherein said rings have generally triangular configurations.

11. The invention of claim 1 wherein said sidewall includes a skirt mounted on said lower tier and generally surrounding said lower tier support bars and, said skirt extending generally between said medial and base rings.

12. The invention of claim 2 wherein each said connector includes a slot extending longitudinally between its ends and wherein said ends are chamfered.

13. The invention of claim 1, which includes said support bars being welded to said rings.

14. The invention of claim 1, which includes:
   a) said sidewall comprising a plurality of sections;
   b) each said section including rim, base, and medial ring segments and upper and lower tier support bars extending therebetween; and
   c) each said section being rotationally molded.

15. The invention of claim 1 wherein:
   a) each said connector includes a reduced-diameter male end extending from a respective ring segment;
   b) each said ring segment includes a receiver open at a respective end thereof; and
   c) said receivers telescopically receive male ends of adjacent ring members.

16. The invention of claim 1 wherein said rings and said support bars have square cross-sectional configurations.

17. The invention of claim 1 wherein each said connector comprises a fitting with at least two female ends each adapted for receiving a respective ring segment end.

18. A method of fabricating a feeder, which comprises the steps of:
   a) extruding a continuous length of plastic tubing;
   b) passing said tubing through a forming shoe;
   c) curving said tubing in said forming shoe;
   d) passing said tubing through a cooler for cooling same;
   e) cutting said tubing into multiple ring segments with predetermined lengths and opposed ring segment ends;
   f) assembling multiple feeder sidewall sections from said ring segments, each said sidewall section having rim, base, and medial ring segments positioned in generally parallel, spaced relation;
   g) providing each said sidewall section with a plurality of upper tier support bars extending between and connected to said rim and medial ring segments;
   h) providing each said sidewall section with a plurality of lower tier support bars extending between and connected to said base and medial ring segments; and
   i) connecting said sections at said ring segment ends whereby said sections form a sidewall for said feeder, said sidewall defining a feeder enclosure adapted for receiving and retaining feed therein.

19. The method of claim 18, which includes the additional steps of:
   a) forming said ring segments with first, lesser radii; and
   b) bending said ring segments in the assembly of the feeder to provide same with second, greater radii in the finished feeder configuration.

20. A livestock feeder having a sidewall including a top and a bottom and forming a feed-receiving enclosure, said sidewall comprising:
   a) a plurality of rings, including a rim ring located at said sidewall top, a base ring located at said sidewall bottom and a medial ring located intermediate said rim and base rings; each said ring comprising a plurality of generally horizontal ring segments, each said ring segment having opposite ends with one of said ends forming a receiver and the other of said ends having a reduced diameter male member extending outwardly therefrom, each said receiver telescopically receiving the male member of an adjacent one of said ring segments;
   b) an upper tier including said rim and medial rings and a plurality of upper tier support bars extending therebetween, each said upper tier support bar including upper and lower ends connected to said rim and medial rings respectively; and
   c) a lower tier including said base and medial rings and a plurality of lower tier support bars, each said lower tier support bar including upper and lower ends connected to said medial and base rings respectively.

\* \* \* \* \*